US010396473B2

(12) United States Patent
Bellete

(10) Patent No.: US 10,396,473 B2
(45) Date of Patent: *Aug. 27, 2019

(54) BATTERY TERMINAL CONNECTOR WITH DIFFERENT SHAPES FOR POSITIVE AND CABLE AND NEGATIVE CABLE

(71) Applicant: Ayele W. Bellete, Annandale, VA (US)

(72) Inventor: Ayele W. Bellete, Annandale, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/937,736

(22) Filed: Mar. 27, 2018

(65) Prior Publication Data

US 2018/0219304 A1     Aug. 2, 2018

Related U.S. Application Data

(63) Continuation of application No. 15/422,863, filed on Feb. 2, 2017, now Pat. No. 9,929,478.

(51) Int. Cl.
| | | |
|---|---|---|
| H01R 11/00 | (2006.01) | |
| H01R 4/42 | (2006.01) | |
| H01R 4/28 | (2006.01) | |
| G01N 27/416 | (2006.01) | |
| B21D 39/03 | (2006.01) | |
| H01R 4/44 | (2006.01) | |
| H01R 13/11 | (2006.01) | |
| H01M 2/30 | (2006.01) | |
| H01R 11/28 | (2006.01) | |

(52) U.S. Cl.
CPC ............ *H01R 4/44* (2013.01); *H01M 2/305* (2013.01); *H01R 11/287* (2013.01); *H01R 13/11* (2013.01); *H01M 2220/20* (2013.01); *H01R 4/42* (2013.01)

(58) Field of Classification Search
CPC ..... H01R 11/281; H01R 11/283; H01R 11/24; H01R 11/288; H01R 13/5812; H01R 4/40; H01R 11/32; H01R 24/54
USPC ............... 439/754, 504, 762, 859, 907, 638; 324/426; 29/428
See application file for complete search history.

(56) References Cited

U.S. PATENT DOCUMENTS

| | | | | |
|---|---|---|---|---|
| 3,223,963 | A * | 12/1965 | Rarey ...................... | H01R 4/50 439/846 |
| 5,332,394 | A * | 7/1994 | Frost ...................... | H01R 13/111 439/125 |
| 5,634,829 | A * | 6/1997 | Kerul ................... | H01R 13/193 439/842 |
| 5,663,012 | A * | 9/1997 | Shannon ............... | H01M 2/206 429/121 |

(Continued)

*Primary Examiner* — Abdullah A Riyami
*Assistant Examiner* — Thang H Nguyen
(74) *Attorney, Agent, or Firm* — Blank Rome LLP

(57) ABSTRACT

A battery terminal connector includes a clamp with extended arms to engage with varying size of terminal post of a battery. A connector extending from the clamp has either a protruded or hollow end depending on whether the clamp is engaged with a positive or negative terminal. A cable connecting a terminal of an external device is shaped to accommodate the connector to supply current to the external device from the battery. The battery terminal connector providing a connecting and cable shaped differently depending on whether it is connected to a positive or negative terminal post of the battery reduces accidents caused by mistakenly cross connecting a positive terminal of the battery to a negative terminal of the external device, and vice versa.

17 Claims, 4 Drawing Sheets

(56) References Cited

U.S. PATENT DOCUMENTS

| | | | |
|---|---|---|---|
| 7,298,136 B1* | 11/2007 | Curtis | G01R 31/2834 |
| | | | 324/754.03 |
| 2006/0025017 A1* | 2/2006 | Sikora | A47G 25/0678 |
| | | | 439/576 |
| 2007/0141900 A1* | 6/2007 | Davis | H01M 2/202 |
| | | | 439/504 |
| 2009/0212779 A1* | 8/2009 | Wenger | G01R 1/203 |
| | | | 324/426 |
| 2011/0269354 A1* | 11/2011 | Falchetti | H01R 11/283 |
| | | | 439/772 |
| 2015/0180144 A1* | 6/2015 | Martens | F02N 11/14 |
| | | | 439/503 |
| 2015/0349438 A1* | 12/2015 | Allen | H01R 13/6205 |
| | | | 439/40 |
| 2015/0349553 A1* | 12/2015 | Chapple | H02J 7/0042 |
| | | | 320/105 |
| 2016/0240941 A1* | 8/2016 | Stavrianoudakis | H01R 11/12 |

* cited by examiner

BATTERY TERMINAL CONNECTOR WITH DIFFERENT SHAPES FOR POSITIVE AND CABLE AND NEGATIVE CABLE

RELATED APPLICATIONS

This application is a continuation of U.S. application Ser. No. 15/422,863, filed Feb. 2, 2017. The entire contents of this application is hereby incorporated by reference.

BACKGROUND OF THE INVENTION

With the advance of renewable energy, batteries are in growing demand due to the intermittent nature of renewable energy supplies. Batteries compensate for the intermittent nature of renewable energy supplies. Accordingly, growth in renewable energy and focus in green technology created a demand for the efficient use of batteries in cars, boats, wind turbines, electric backup generators, as well as computer server room backup batteries. However, a majority of these batteries are not portable and cannot be used to supply power to other external devices. Where a battery has positive and negative terminal posts, conventional jumper cables could be connected to these posts to supply electricity from an external device to the battery, or vice versa. The conventional jumper cables, however, are susceptible to accidents caused by mistakenly connecting a positive terminal post of the battery to a negative terminal post of the external device, and vice versa.

According to one embodiment of the battery terminal connector of the present invention, each positive and negative terminal post is connected to a differently shaped positive and negative cable, respectively, to prevent such mistakes. According to another embodiment of the battery terminal connector of the present invention, the diameter of a clamp at least partially surrounding a positive or negative terminal posts of a battery can be adjusted to accommodate various sizes of battery terminal posts. According to another embodiment of the battery terminal connector of the present invention, the positive and negative cables can be easily connected to the clamps surrounding the terminal posts of the battery via a positive and negative connectors.

DETAILED DESCRIPTION OF THE PREFERRED EMBODIMENTS

Figure 1:
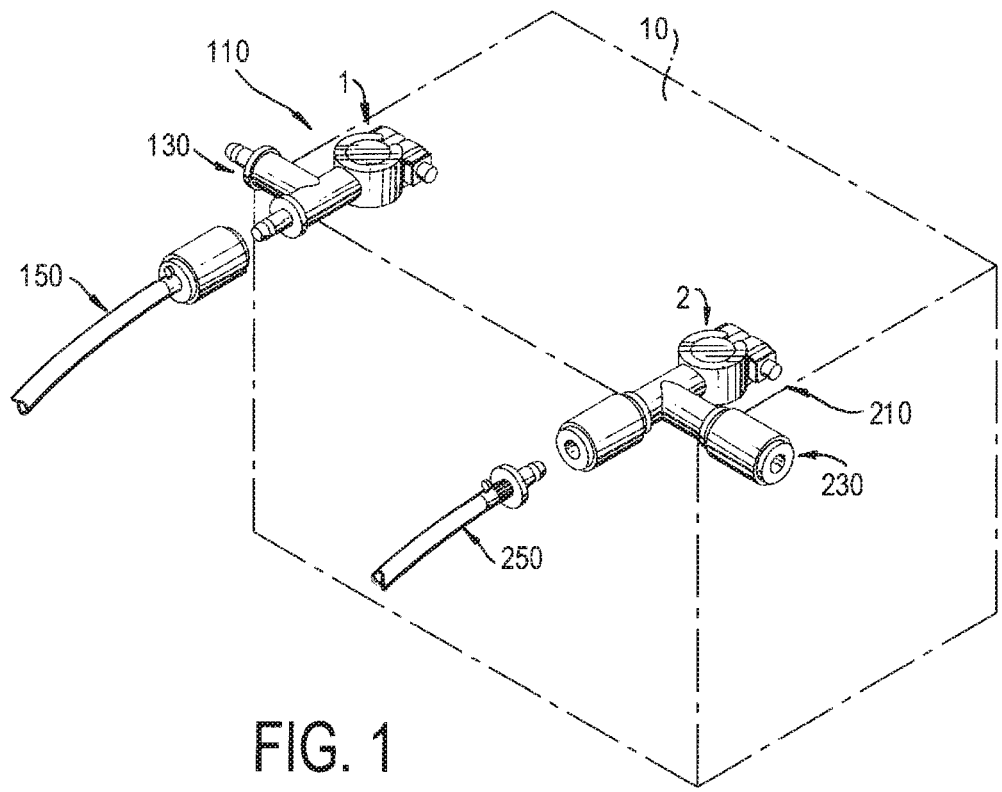
FIG. 1 is a 3-dimensional view of an embodiment of a battery terminal connector of the present invention connected to a battery.

In describing the preferred embodiments of the present invention illustrated in the drawings, specific terminology is used for the sake of clarity. However, the present invention is not intended to be limited to the specific terms so selected, and it is to be understood that each specific term includes all technical equivalents that operate in a similar manner to accomplish a similar purpose.

Figure 2:
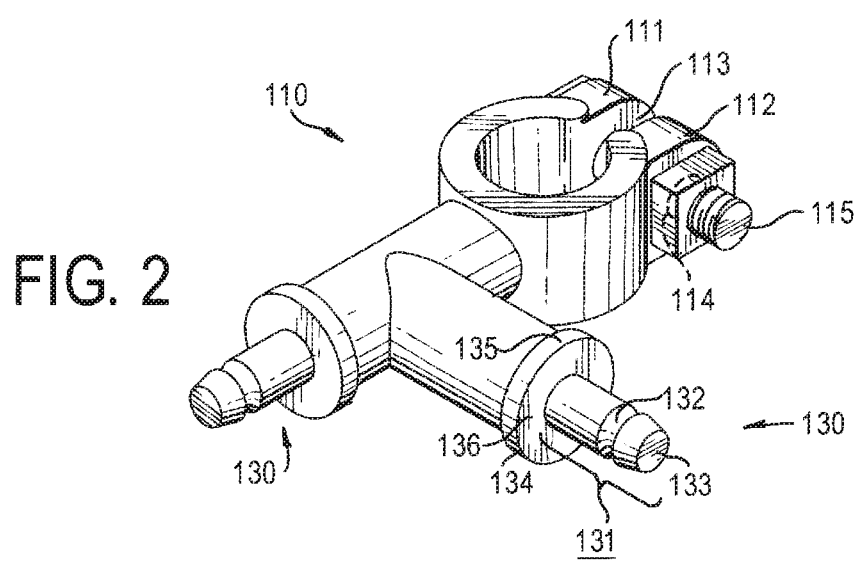
FIG. 2 is a 3-dimensional view of a positive terminal clamp 110 and positive connector 120 of FIG. 1.
Figure 3:
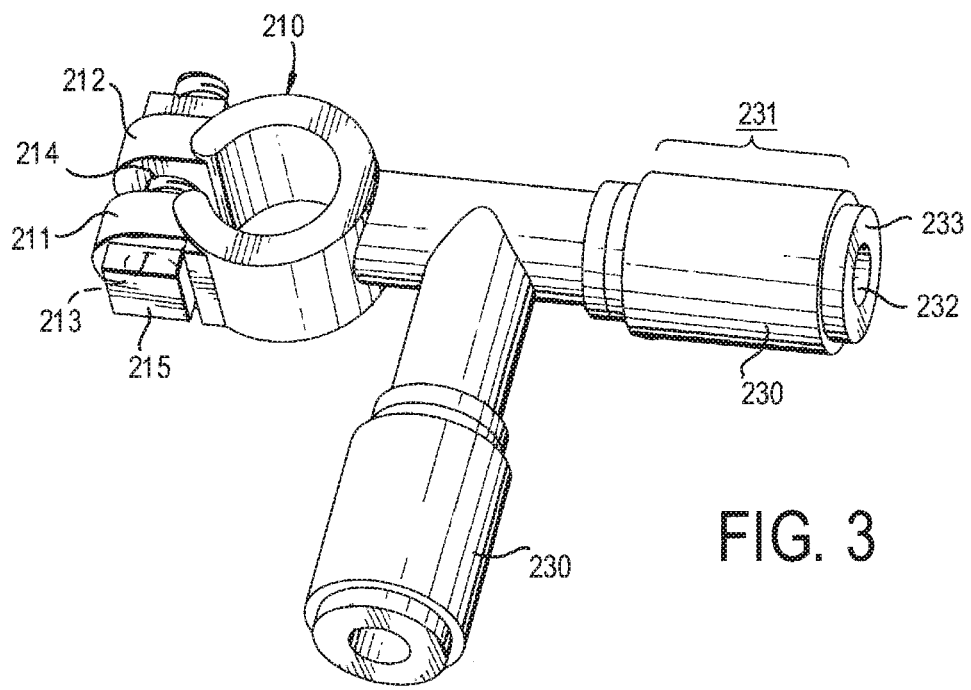
FIG. 3 is a 3-dimensional view of a negative terminal clamp 210 and negative connector 220 of FIG. 1.
Figure 5:
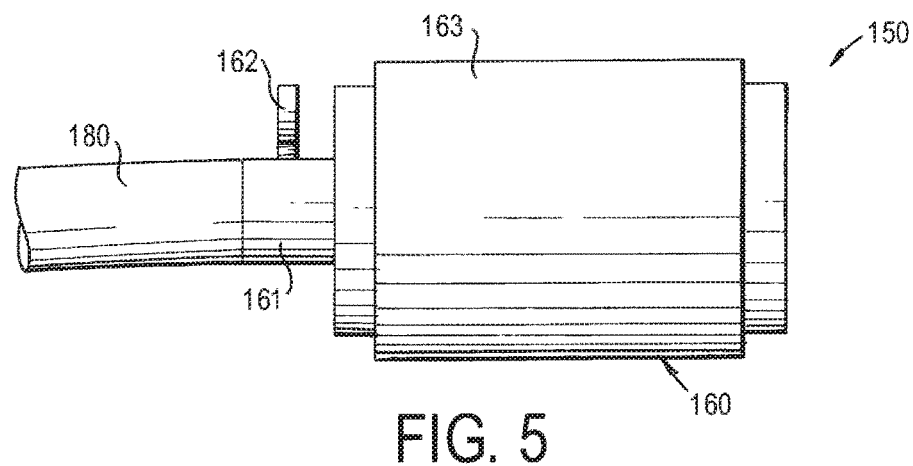
FIG. 5 is a 3-dimensional side view of a positive cable 150 of FIGS. 1 and 5.
Figure 6:
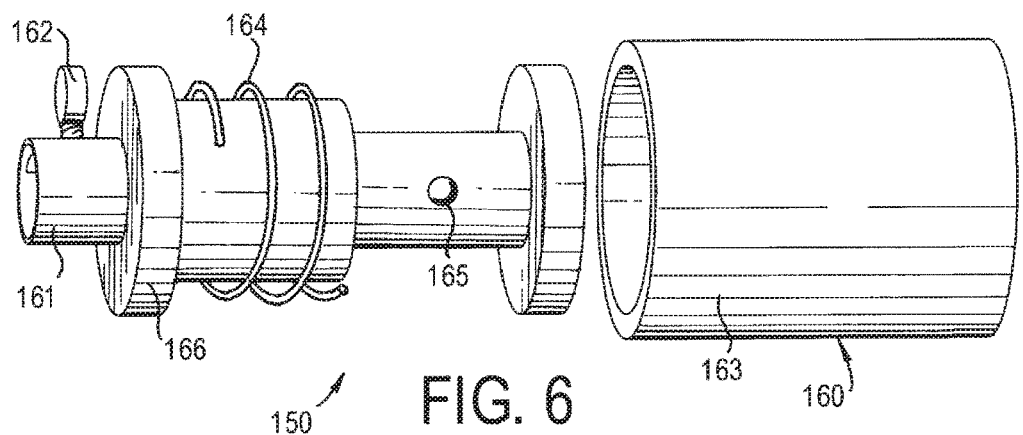
FIG. 6 is a 3-dimensional side view of a female cap 160 of FIG. 5.
Figure 7:
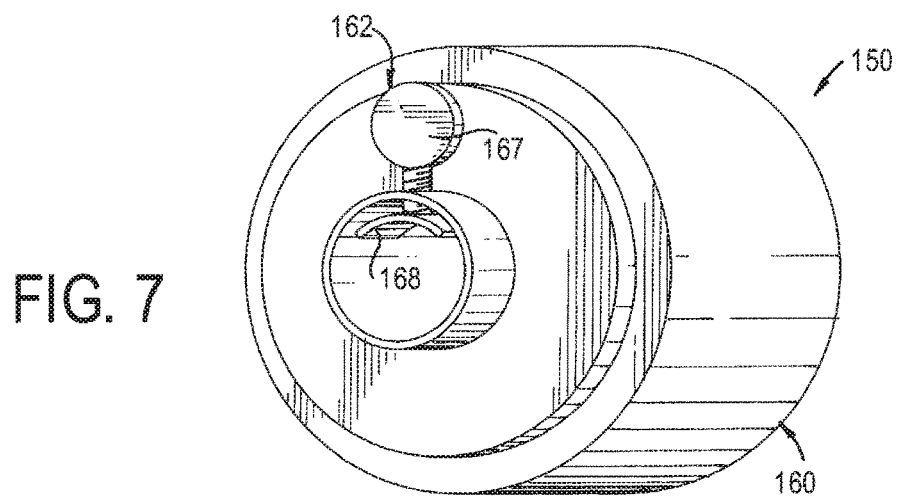
FIG. 7 is a 3-dimensional rear view of a female cap 160 of FIG. 5.
Figure 9:
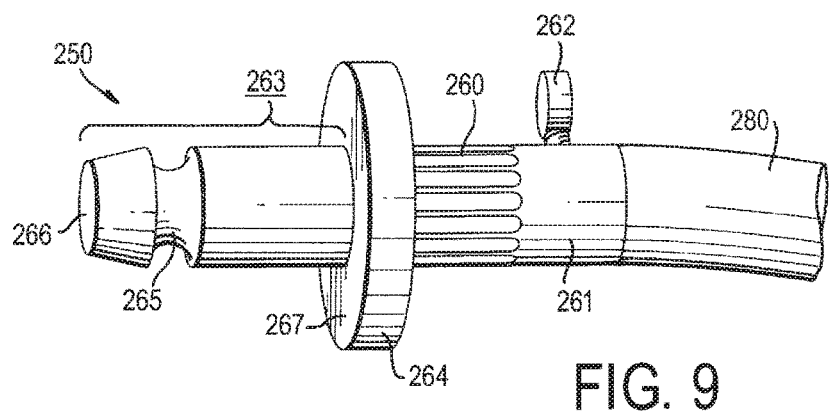
FIG. 9 is a 3-dimensional side view of a male cap 260 of FIG. 8.
Figure 10:
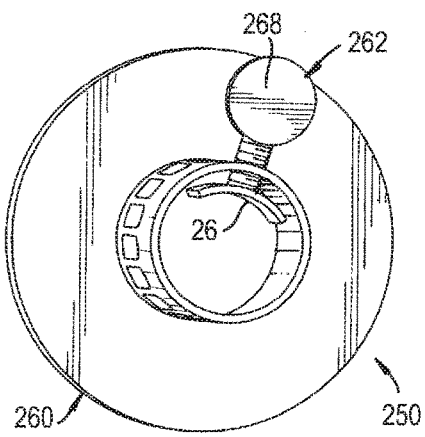
FIG. 10 is a 3-dimensional rear view of a male cap 260 of FIG. 8.

Turning to the drawings, FIG. 1 shows a 3-dimensional overview of one embodiment of a battery terminal connector consistent with the present invention, the connector having positive and negative terminal clamps 110, 210, positive and negative connectors 130, 230, and positive and negative cables 150, 250 connected to a battery 10. Positive terminal clamp 110 and positive connector 130 of FIG. 1 are also shown in FIG. 2. Negative terminal clamp 210 and negative connector 230 of FIG. 1 are also shown in FIG. 3. Positive cable 150 of FIG. 1 is also shown in FIGS. 5-7. Negative cable 250 of FIG. 1 is also shown in FIGS. 9-10.

Returning to FIG. 1, battery 10 comprises a positive terminal post 1 and negative terminal post 2. Battery 10 may be installed within a vehicle or, alternatively, may be a standalone energy storage device connectable to any other external device(s). Positive terminal clamp 110 at least partially surrounds the positive terminal post 1 of the battery 10, enough to engage with positive terminal post 1. Likewise, negative terminal clamp 210 at least partially surrounds negative terminal post 2 of the battery 10, enough to engage with negative terminal post 2.

Positive connector 130 extends from positive terminal clamp 110. Positive cable 150, connectable to a positive terminal of an external device, removably engages with positive terminal clamp 110. Similarly, negative connector 230 extends from negative terminal clamp 210. Negative cable 250, connectable to a negative terminal of an external device, engages with negative terminal clamp 210. Although positive and negative connectors 130, 230, are depicted in this embodiment as extending outwardly between positive and negative terminal clamps 110, 210, and positive and negative cables 150, 250, it is understood by those of ordinary skill in the art that positive and terminal connectors 130, 230 may extend elsewhere on the apparatus, in accordance with additional embodiments of the invention.

FIG. 2 shows a 3-dimensional view of positive terminal clamp 110 of FIG. 1 with positive connector 130. Positive terminal clamp 110 has a pair of extended arms 111, 112. Each extended arm 111, 112 has openings 113, 114, respectively. Openings 113, 114 each house a portion of screw 115 connecting extended arm 111 and extended arm 112. Positive terminal clamp 110 can engage with various size of positive terminal posts by tightening or loosening screw 115 and adjusting the diameter of positive terminal clamp 110. Screw 115 may be used in conjunction with a nut and bolt to further secure extended arms 111, 112.

Positive connectors 130 extending from positive terminal clamp 110 each have a male receptacle or protruded end 131 connectable to positive cable 150. Positive connector 130 connects to positive cable 150 by injecting protruded end 131 into a mating female receptacle of the positive cable 150 (as shown in FIG. 1). As depicted in an exemplary embodiment in FIG. 2, protruded end 131 may have a ridge 132 to further secure the connection between positive connector 130 and positive cable 150. Positive connector 130 may further comprise a lip 134 protruding from an outer surface of positive connector 130 to act as a stop for positive cable 150 as it is inserted onto the connector 130. The outer surface of protruded end 131 is sized appropriately to allow sufficiently large electrical current to flow from positive terminal post 1 (of FIG. 1) to a positive terminal of an external device via positive cable 150 (of FIG. 1). Tip 133 of protruded end 131 may also be in physical contact with positive cable 150 to increase the surface contact between positive connector 130 and positive cable 150. Protruded end 131 may comprise more than one ridge to increase the surface contact between positive connector 130 and positive cable 150 and/or secure the connection between positive connector 130 and positive cable 150. In accordance with an exemplary embodiment, one positive connector 130 of FIG. 2 can be connected to positive terminal post 1 to a vehicle's motor. The other positive connector 130 of FIG. 2 is normally free and can receive a jump pack connection. There can be more or less than two positive connectors 130.

In accordance with an exemplary embodiment, the outer surface of positive connector 130 from the positive terminal clamp 110 to the ring 135 of lip 134 is non-conductive. The remaining outer surface of positive connector 130, including the surface of lip 134 from which protruded 131 extends, is conductive.

FIG. 3 shows a 3-dimensional view of negative terminal clamp 210 of FIG. 1 with negative connector 230. Negative terminal clamp 210 has a pair of extended arms 211, 212. Each extended arm 211, 212 has openings 213, 214, respectively. Openings 213, 214 each house a portion of screw 215 connecting extended arm 211 and extended arm 212. Negative terminal clamp 210 can engage with various size of negative terminal posts by tightening or loosening screw 215 and adjusting the diameter of negative terminal clamp 210. Screw 215 may be used in conjunction with a nut and bolt to further secure extended arms 211, 212.

Negative connectors 230 extending from negative terminal clamp 210 each have a female receptacle or hollow end 231 connectable to male receptacle of the negative cable 250 (as shown in FIG. 1). As depicted in an exemplary embodiment, negative connector 230 connects to negative cable 250 housing a portion of negative cable 250 within hollow end 231, in particular opening 232 at tip 233.

The portion of negative connector 230, excluding tip 233 and the inner surface of opening 232, has non-conductive outer surface. The surface of tip 233 and the inner surface of opening 232 is conductive.

Figure 4:
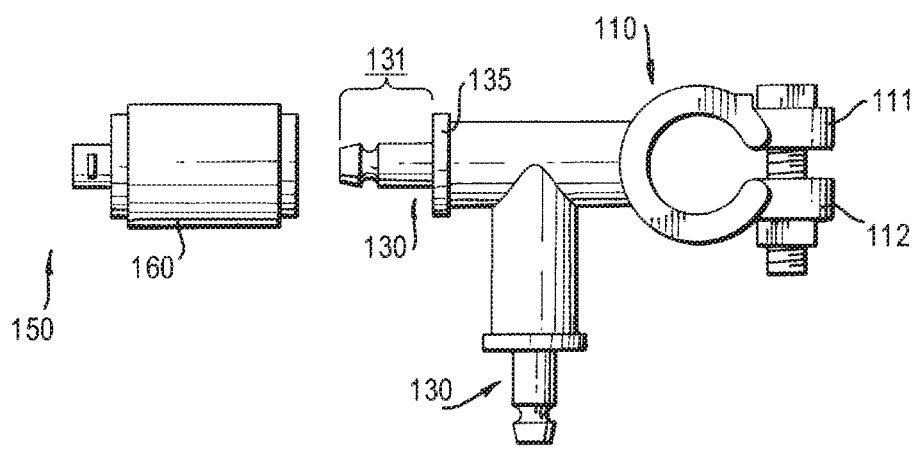
FIG. 4 is a top view of a positive terminal clamp 110, positive connector 130 and a positive cable (150) of FIG. 1.
Figure 4:
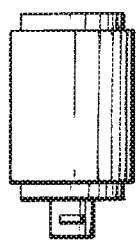

FIG. 4 shows a top view of positive terminal clamp 110 with extended arms 111, 112, positive connectors 130, and positive cable 150. Positive cable 150 is connected to positive connector 130 by inserting protruded end 131 into female cap 160 of positive cable 150. Lip 135 of positive connector 130 acts as a stop for positive cable 150 when protruded end 131 is inserted into female cap 160. Also, as shown in FIG. 4, more than one positive connector 130 may extend from positive terminal clamp 110 to supply current from battery 10 to more than one external device (or from an external jump to motorized vehicle battery 10). In accordance with an exemplary embodiment, one positive connector 130 of FIG. 4 can be connected to positive terminal post 1 to a vehicle's motor. The other positive connector 130 of FIG. 4 is normally free and can receive a jump pack connection. There can be more or less than two positive connectors 130.

FIG. 5 shows a side view of positive cable 150 comprising female cap 160 and electrical wire 180 connected to female cap 160. Electrical wire 180 is inserted into one end of hollow cylinder body 161 of female cap 160 and secured by screw clamp 162. Hollow cylinder body 161 is covered by removable cover 163. The outer surface of removable cover 163 is non-conductive.

FIG. 6 shows a 3-dimensional side view of hollow cylinder body 161 separated from cover 163, in accordance with an exemplary embodiment. Spring 164 wraps around at least a portion of hollow cylinder body 161 to help secure hollow cylinder body 161 within cover 163 when hollow cylinder body 161 is placed inside cover 163. Hollow cylinder body 161 comprises ball bearing 165 securing protruded end 131 of positive connector 130 (of FIG. 4) when protruded end 131 is inserted into hollow cylinder body 161 of female cap 160. Hollow cylinder body 161 also comprises lip 166 to act as a stop for cover 163 when hollow cylinder body 161 is placed inside cover 163.

FIG. 7 shows a 3-dimensional rear view of positive cable 150. Clamp 162 penetrates one end of hollow cylinder body 161 inwardly toward the axis of hollow cylinder body 161. Clamp 162 comprises tab 167 for tightening or loosening clamp 162 and plate 168 to press against electrical wire 180 without puncturing it. The inner surface of hollow cylinder body 161 is conductive.

Figure 8:
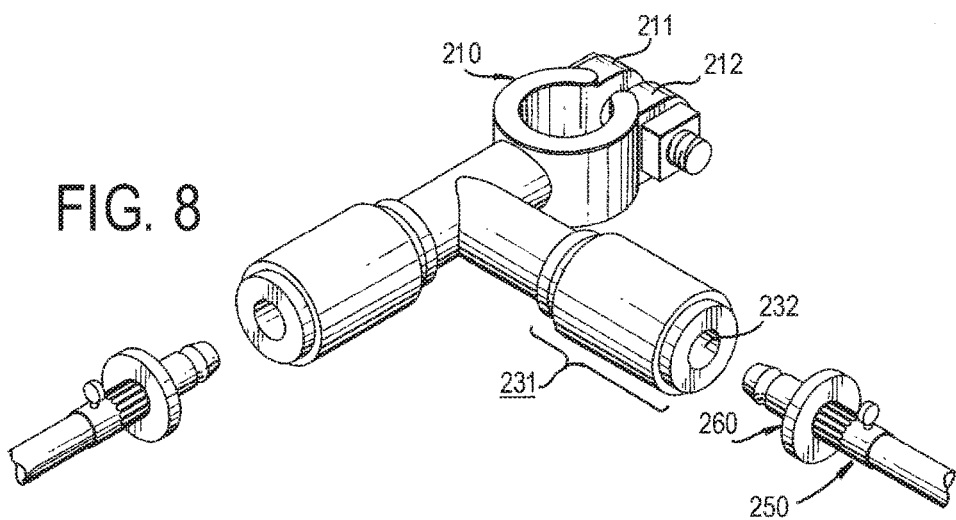
FIG. 8 is a 3-dimensional top view of a negative terminal clamp 210, negative connector 230 and a negative cable 250 of FIG. 1.

FIG. 8 shows a 3-dimensional top view of negative terminal clamp 210 with extended arms 211, 212, negative connectors 230, and negative cable 250. Negative cable 250 is connected to negative connector 230 by inserting male cap 260 of negative cable 250 into opening 232 of hollow end 231. As shown in FIG. 8, more than one negative connector 230 may extend from negative terminal clamp 210 to supply current from battery 10 to more than one external device. In accordance with an exemplary embodiment, one negative connector 230 of FIG. 8 can be connected to negative terminal post 2 to a vehicle's motor. The other positive connector 230 of FIG. 8 is normally free and can receive a jump pack connection. There can be more or less than two negative connector 230.

FIG. 9 shows a 3-dimensional side view of negative cable 250 comprising male cap 260 and electrical wire 280 connected to male cap 260. Electrical wire 280 is inserted into one end of hollow cylinder body 261 of male cap 260 and secured by clamp 262. The other end 263 of hollow cylinder body 261 is shaped to fit into opening 232 of hollow end 231 of negative connector 230 (of FIG. 8). Lip 264 protrudes from the outer surface of hollow cylinder body 261 between clamp 262 and end 263 to act as a stop for hollow end 231 of negative connector 230 when end 263 of male cap 260 is inserted into hollow end 231 of negative connector.

In one embodiment, end 263 of male cap 260 of negative cable 250 is substantially similar to protruded end 131 of positive connector 130 (e.g., of FIG. 3). For instance, the shape of end 263 may be substantially similar to protruded end 131 to include ridge 265 to increase the contact area between male cap 260 of negative cable 250 and hollow end 231 of negative connector 230. Ridge 265 may further secure the connection between negative cable 250 and negative connector 230. Tip 266 of end 263 may have a closed surface to increase the surface contact between negative cable 250 and negative connector 230. End 263 of male cap 260 of negative cable may comprise more than one ridge to increase the surface contact between the negative cable 250 and negative connector 230 and/or secure the connection between negative cable 250 and negative connector 230.

The portion of hollow cylinder body 261 from tip 266 before lip 264, including surface 267 of lip 264 from which end 263 protrudes, may be conductive material and/or may be coated with conductive material. The outer surface of the remaining portion of hollow cylinder body 261 may be non-conductive.

FIG. 10 shows a 3-dimensional rear view of male cap 260. Clamp 262 penetrates one end of hollow cylinder body 261 inwardly toward the axis of hollow cylinder body 261. Clamp 262 includes tab 268 for tightening or loosening clamp 262 and plate 269 to press against electrical wire 280 without puncturing it. The inner surface of hollow cylinder body 261 is conductive.

Positive connector 130, negative connector 230, female cap 160 and male cap 260 may be configured as quick release and connect, as shown, to provide a reliable connector that is easy to connect and disconnect. However, any suitable connector can be utilized.

Positive connector 130 mates with female cap 160 and negative connector 230 mates with male cap 260. Positive connector 130 differs from negative connector 230, so that the positive connector 130 can only connect to the female cap 160 and cannot connect to the male cap 260. Likewise, the negative connector 230 differs from the positive connector 130, so that the negative connector 230 can only connect to the male cap 260 and cannot connect to the female cap 160. A jump pack according to an embodiment of the present invention includes positive cable 150 and the positive connector 130, and negative cable 250 and negative connector 230, to connect with free positive connector 130 and free negative connector 230, respectively.

The description and drawings of the present invention provided in the specification should be considered as illustrative only. The invention may be configured in a variety of ways and is not intended to be limited by the preferred embodiments. Numerous applications of the invention will readily occur to those skilled in the art. Therefore, it is not desired to limit the invention to the specific examples disclosed or the exact construction and operation shown and described. Rather, all suitable modifications and equivalents fall within the scope of the invention.

The invention claimed is:

1. A terminal connector comprising:
   a positive connector connectable to a positive terminal of a battery, the positive connector also having a first end of a first shape connectable to a positive cable; and
   a negative connector connectable to a negative terminal of the battery, the negative connector also having a first end of a second shape connectable to a negative cable,
   wherein the positive cable has an end of a third shape connectable to the first end of the positive connector;
   wherein the negative cable has an end of a fourth shape connectable to the first end of the negative connector; and
   wherein the first shape is different from the second shape and the third shape is different from the fourth shape so that the first end of the positive connector is not connectable to the fourth shape end of the negative cable, and the first end of negative connector is not connectable to the third shape end of the positive cable.

2. The terminal connector of claim 1, wherein the first end of the positive connector has a protruded end and the first end of the negative connector has a hollow end.

3. A battery terminal connector comprising:
   a positive terminal clamp for at least partially surrounding a positive terminal post of a battery;
   a negative terminal clamp for at least partially surrounding a negative terminal post of the battery;
   a positive connector extending from the positive terminal clamp and comprising a protruded end connectable to a positive cable; and
   a negative connector extending from the negative terminal clamp and comprising a hollow end connectable to a negative cable,
   wherein the positive cable is shaped differently from the negative cable so that the positive connector is connectable to the positive cable but not the negative cable and the negative connector is connectable to the negative cable but not the positive cable.

4. The battery terminal connector of claim 3, wherein the positive cable comprises a female cap to house the protruded end of the positive connector.

5. The battery terminal connector of claim 4, wherein the female cap comprises:
   a hollow cylinder body with a clamp on one end to secure an electrical wire and a ball bearing on the other end to secure the protruded end of the positive connector inserted into the hollow cylinder body;
   a cover of the hollow cylinder body; and
   a spring at least partially wrapping an outer surface of the hollow cylinder body to secure the hollow cylinder body inside the cover.

6. The battery terminal connector of claim 5, wherein the clamp of the hollow cylinder body comprises a screw penetrating the hollow cylinder body inwardly toward an axis of the hollow cylinder body.

7. The battery terminal connector of claim 5, wherein the hollow cylinder body comprises a lip protruding from the outer surface of the hollow cylinder body between the clamp of the hollow cylinder body and the spring to act as a stop for the cover.

8. The battery terminal connector claim 3, wherein the negative cable comprises a male cap to fit the hollow end of the negative connector.

9. The battery terminal connector of claim 8, wherein the male cap comprises:
   a hollow cylinder body with a clamp on one end to secure an electrical wire and the other end shaped to fit into the hollow end of the negative connector; and
   a lip protruding from an outer surface of the hollow cylinder body between the clamp and the other end of the hollow cylinder body to act as a stop for the hollow end of the negative connector.

10. The battery terminal connector of claim 9, wherein the clamp of the hollow cylinder body comprises a screw penetrating the hollow cylinder body inwardly toward an axis of the hollow cylinder body.

11. A battery terminal connector comprising:
    a positive terminal clamp for at least partially surrounding a positive terminal post of a battery;
    a negative terminal clamp for at least partially surrounding a negative terminal post of the battery;
    a positive connector extending from the positive terminal clamp and comprising a protruded end connectable to a positive cable;
    a negative connector extending from the negative terminal clamp and comprising a hollow end connectable to a negative cable but not the positive cable,
    wherein the positive cable comprises a female cap to house the protruded end of the positive connector; and
    wherein the female cap of the positive cable comprises:
    a hollow cylinder body with a clamp on one end to secure an electrical wire and a ball bearing on the other end to secure the protruded end of the positive connector inserted into the hollow cylinder body;
a cover of the hollow cylinder body; and
a spring at least partially wrapping an outer surface of the hollow cylinder body to secure the hollow cylinder body inside the cover.

12. The battery terminal connector of claim 11, wherein the clamp of the hollow cylinder body comprises a screw penetrating the hollow cylinder body inwardly toward an axis of the hollow cylinder body.

13. The battery terminal connector of claim 11, wherein the hollow cylinder body comprises a lip protruding from the outer surface of the hollow cylinder body between the clamp of the hollow cylinder body and the spring to act as a stop for the cover.

14. The battery terminal connector claim 11, wherein the negative cable comprises: a male cap to fit the hollow end of the negative connector.

15. The battery terminal connector of claim 14, wherein the male cap comprises:
a hollow cylinder body with a clamp on one end to secure an electrical wire and the other end shaped to fit into the hollow end of the negative connector; and
a lip protruding from an outer surface of the hollow cylinder body between the clamp and the other end of the hollow cylinder body to act as a stop for the hollow end of the negative connector.

16. The battery terminal connector of claim 15, wherein the clamp of the hollow cylinder body of the male cap comprises a screw penetrating the hollow cylinder body inwardly toward an axis of the hollow cylinder body.

17. A battery terminal connector comprising:
a positive terminal clamp for at least partially surrounding a positive terminal post of a battery;
a negative terminal clamp for at least partially surrounding a negative terminal post of the battery;
a positive connector extending from the positive terminal clamp and comprising a protruded end connectable to a positive cable;
a negative connector extending from the negative terminal clamp and comprising a hollow end connectable to a negative cable but not the positive cable,
wherein the negative cable comprises a male cap to fit the hollow end of the negative connector; and
wherein the male cap of the negative cable comprises:
a hollow cylinder body with a clamp on one end to secure an electrical wire and the other end shaped to fit the hollow end of the negative connector; and
a lip protruding from an outer surface of the hollow cylinder body between the clamp and the other end of the hollow cylinder body to act as a stop for the hollow end of the negative connector.

* * * * *